(12) United States Patent
Shi et al.

(10) Patent No.: US 9,715,074 B2
(45) Date of Patent: Jul. 25, 2017

(54) ACCESS TERMINAL BOX

(71) Applicant: HUAWEI TECHNOLOGIES CO., LTD., Shenzhen (CN)

(72) Inventors: Deyi Shi, Shenzhen (CN); Yeren Wang, Shenzhen (CN); Guanhua Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/147,243

(22) Filed: May 5, 2016

(65) Prior Publication Data

US 2016/0327766 A1 Nov. 10, 2016

Related U.S. Application Data

(63) Continuation of application No. PCT/CN2015/078561, filed on May 8, 2015.

(51) Int. Cl.
*G02B 6/44* (2006.01)

(52) U.S. Cl.
CPC .................. *G02B 6/4446* (2013.01)

(58) Field of Classification Search
CPC .... G02B 6/4439; G02B 6/444; G02B 6/4441; G02B 6/4445; G02B 6/4446; G02B 6/4447
See application file for complete search history.

(56) References Cited

U.S. PATENT DOCUMENTS

| 6,315,598 B1 | 11/2001 | Elliot et al. |
| 2006/0254794 A1 | 11/2006 | Burke et al. |
| 2010/0142899 A1 | 6/2010 | Zhou et al. |
| 2010/0239210 A1* | 9/2010 | Wakileh ............... G02B 6/4441 385/55 |

(Continued)

FOREIGN PATENT DOCUMENTS

| CN | 101285915 A | 10/2008 |
| CN | 101840039 A | 9/2010 |
| CN | 201909866 U | 7/2011 |

(Continued)

OTHER PUBLICATIONS

International Search Report dated Feb. 14, 2016 in corresponding International Patent Application No. PCT/CN2015/078561.

(Continued)

*Primary Examiner* — John M Bedtelyon
(74) *Attorney, Agent, or Firm* — Staas & Halsey LLP (57) ABSTRACT

An access terminal box includes a protective cover, a base, and a base plate, where the protective cover includes a cover plate and side walls that are disposed around the cover plate, the cover plate and the side walls form an open-mouthed box structure, the base is fastened inside the open-mouthed box structure of the protective cover by using a first detachable structure, the base is fastened to the base plate by using a second detachable structure. In embodiments of the present invention, when the base is to be detached from the base plate, it is not required to first detach the protective cover; therefore, a fiber coiled on the base can be better protected, damage to the fiber can be avoided, and it is suitable for non-professional personnel to detach the access terminal box.

9 Claims, 7 Drawing Sheets

(56) References Cited

U.S. PATENT DOCUMENTS

2011/0262094 A1    10/2011   Burke
2013/0098677 A1     4/2013   Benedetto et al.

FOREIGN PATENT DOCUMENTS

| CN | 203385910 U | 1/2014 |
| CN | 204101775 U | 1/2015 |
| FR | 2 957 155 | 9/2011 |

OTHER PUBLICATIONS

Extended European Search Report dated Apr. 28, 2017 in corresponding European Patent Application No. 15807776.8.

* cited by examiner

ACCESS TERMINAL BOX

CROSS-REFERENCE TO RELATED APPLICATIONS

This application is a continuation of International Application No. PCT/CN2015/078561, filed on May 8, 2015, which is hereby incorporated by reference in its entirety.

TECHNICAL FIELD

Embodiments of the present invention relate to the field of communications technologies, and in particular, to an access terminal box.

BACKGROUND

Because fiber optic communications has advantages such as a large capacity, a long distance, and anti-electromagnetic interference, the fiber optic communications better caters to people's requirements for a large information amount and high precision in the future, and a low price makes a transmission medium of fiber be promoted in a quite large scope. Currently, a fiber network is already gradually being used in home. Mounting of fiber to the home generally includes mounting of an access terminal box (ATB) and mounting of an optical network terminal (ONT). The access terminal box and the optical network terminal are indoor application products of a user on an optical network, and the access terminal box and the optical network terminal are connected by using a leading-out optical cable of the access terminal box. Because mounting of fiber to the home needs to be performed inside a house of the user, a simplified mounting method is required to implement popularization of fiber to the home.

Figure 1:
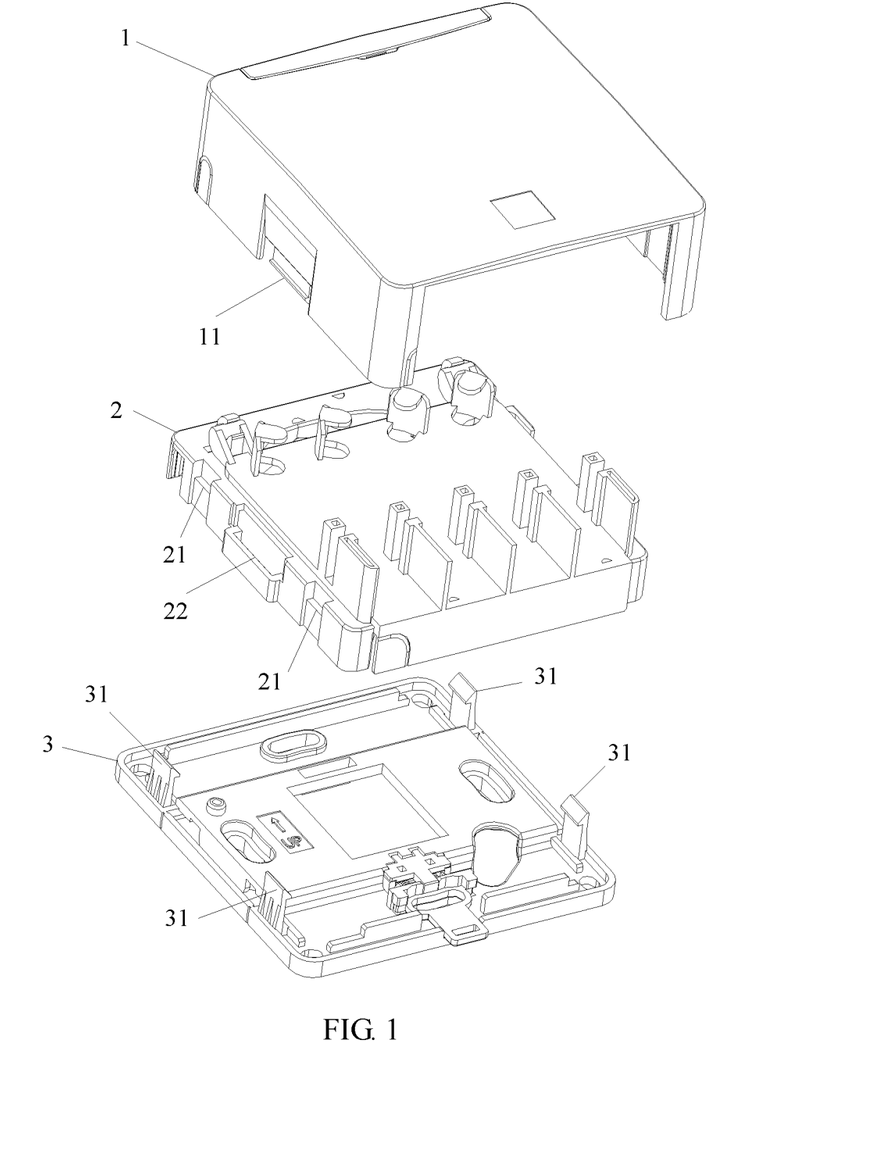
FIG. 1 is a schematic structural diagram of an existing access terminal box.

FIG. 1 shows an access terminal box in the prior art, where the access terminal box includes a protective cover 1, a base 2, and a base plate 3. An adapter mounting area, a splicing area, and a coiling area are generally arranged on the base 2, the base plate 3 is fastened to a locking slot 21 on the base by using a locking hook 31, and the protective cover is fastened to a locking slot 22 on the base 2 by using a locking hook 11. The locking hook 31 is hidden inside the protective cover 1, and the locking hook 31 can be unlocked from the locking slot 21 and the base 2 can be detached from the base plate 3 only by first detaching the protective cover 1. Because a large quantity of fibers are coiled on the base 2, when non-professional personnel detach the base 2 from the base plate 3, they are likely to touch a fiber, which tends to cause damage to the fiber.

SUMMARY

Embodiments of the present invention provide an access terminal box, and when a base is to be detached from a base plate, it is not required to first detach a protective cover; therefore, a fiber coiled on the base can be better protected, and damage to the fiber can be avoided.

According to a first aspect, an access terminal box is provided, including a protective cover, a base, and a base plate, where the protective cover includes a cover plate and side walls that are disposed around the cover plate, the cover plate and the side walls form an open-mouthed box structure, the base is fastened inside the open-mouthed box structure of the protective cover by using a first detachable structure, the base is fastened to the base plate by using a second detachable structure, the second detachable structure includes a first locking hook that is arranged to protrude from a bottom plane of the base and a first locking slot that is correspondingly arranged on the base plate, and the first locking hook and the first locking slot lock to fasten the base to the base plate.

With reference to the first aspect, in a first possible implementation manner of the first aspect, the first locking hook includes a locking body and a locking tip, where the locking tip protrudes from the bottom plane of the base, the locking body protrudes from a plane on which a side wall of the base is located, a groove is correspondingly arranged on a side wall of the protective cover, and the groove is configured to accommodate the locking body.

With reference to the first aspect, in a second possible implementation manner of the first aspect, the first detachable structure includes a concave part and a convex part, where the concave part is arranged on a side wall of the base, the convex part is correspondingly arranged inside a side wall of the protective cover, and the convex part and the concave part fit into each other to fasten the base to the protective cover.

With reference to the first aspect, in a third possible implementation manner of the first aspect, the first detachable structure further includes a second locking hook and a second locking slot, the second locking hook is arranged on a side wall opposite to the side wall, on which the concave part is arranged, of the base, the second locking slot is arranged on a side wall opposite to the side wall, on which the convex part is arranged, of the protective cover, and the second locking hook and the second locking slot lock to fasten the base to the protective cover.

With reference to the first aspect or the second possible implementation manner of the first aspect, in a fourth possible implementation manner of the first aspect, the concave part is a fastening hole, and the convex part is a fastening pillar.

With reference to the first aspect or the third possible implementation manner of the first aspect or the fourth possible implementation manner of the first aspect, in a fifth possible implementation manner of the first aspect, there are two fastening pillars, and there are two fastening holes.

With reference to the first aspect or the third possible implementation manner of the first aspect or the fourth possible implementation manner of the first aspect, or the fifth possible implementation manner of first aspect, in a sixth possible implementation manner of the first aspect, there are two first locking hooks, and there are two first locking slots.

With reference to the first aspect, in a seventh possible implementation manner of the first aspect, an adapter through-hole is further arranged on a side wall, on which a convex part is arranged, of the protective cover.

With reference to the first aspect, in an eighth possible implementation manner of the first aspect, a movable label plate is further arranged on a side wall, on which a second locking slot is arranged, of the protective cover.

With reference to the first aspect, in a ninth possible implementation manner of the first aspect, a structure of the access terminal box is square-shaped.

Based on the foregoing technical solutions, in the access terminal box provided in the embodiments of the present invention, the base is fastened inside an open-mouthed box structure of a protective cover by using a first detachable structure, the base is fastened to a base plate by using a second detachable structure, the second detachable structure includes a first locking hook that is arranged to protrude from a bottom plane of the base and a first locking slot that is correspondingly arranged on the base plate, and the first locking hook and the first locking slot lock to fasten the base to the base plate. When the protective cover and the base are fastened to each other, mounting and detachment of the base and the base plate are not affected. similarly, when the base and the base plate are fastened to each other, mounting and detachment of the protective cover and the base are not affected either. Compared with an existing practice in which a base can be detached from a base plate only by first detaching a protective cover from the base, the practice in the embodiments is suitable for non-professional personnel to detach the access terminal box, and can better protect a fiber coiled on the base and avoid damage to the fiber coiled on the base.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
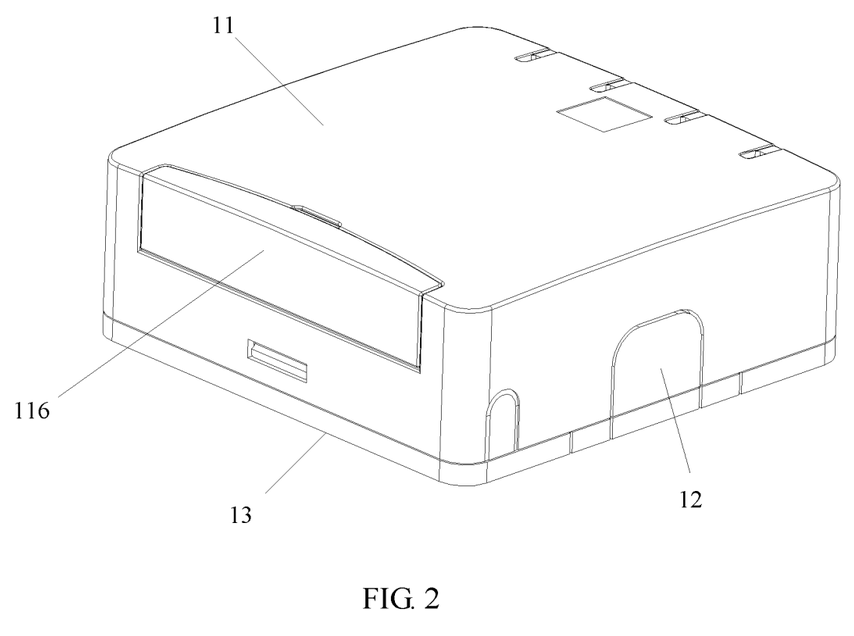
FIG. 2 is a schematic diagram of a three-dimensional structure of an access terminal box according to an embodiment of the present invention.
Figure 3:
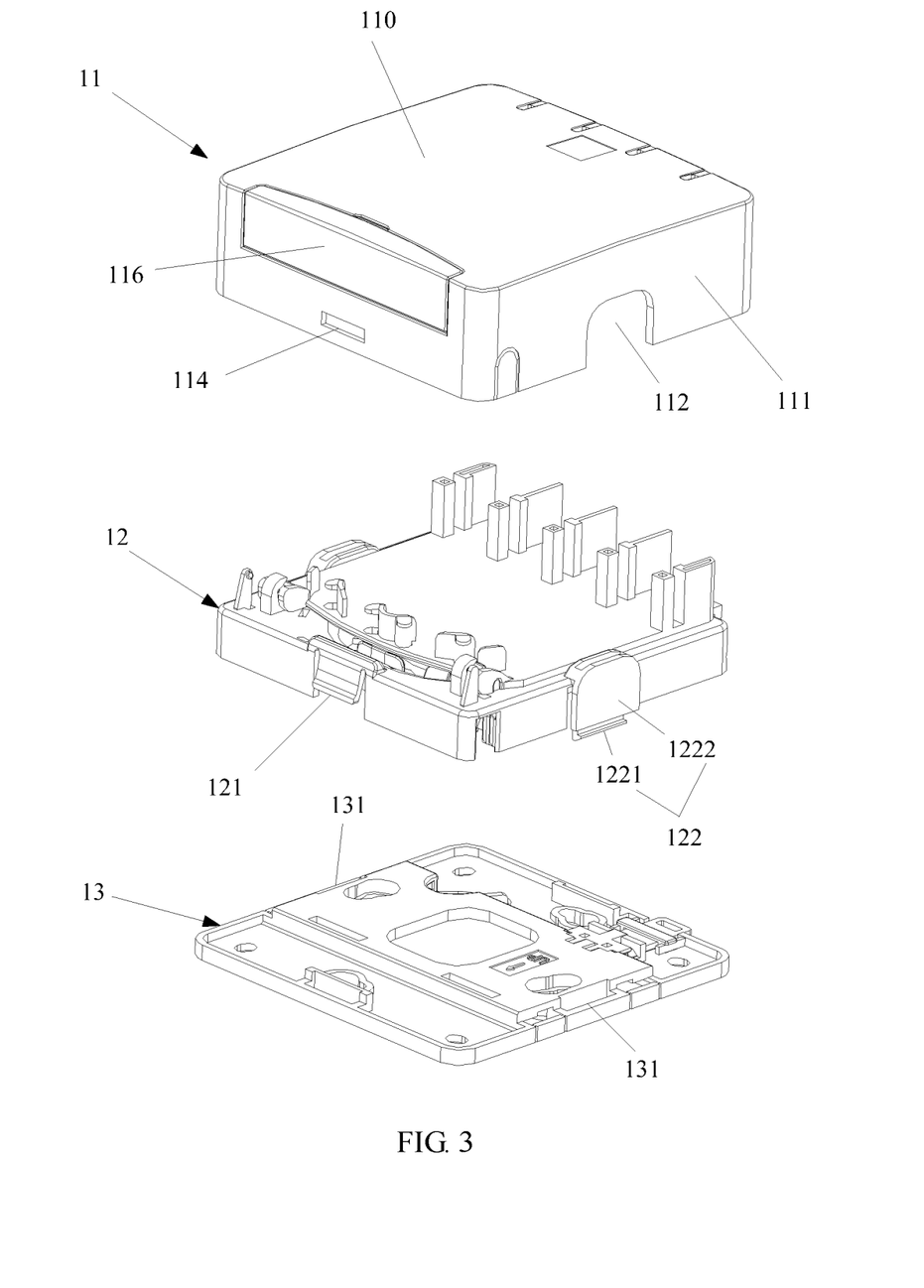
FIG. 3 is a schematic diagram of an exploded three-dimensional structure of an access terminal box according to an embodiment of the present invention.
Figure 4:
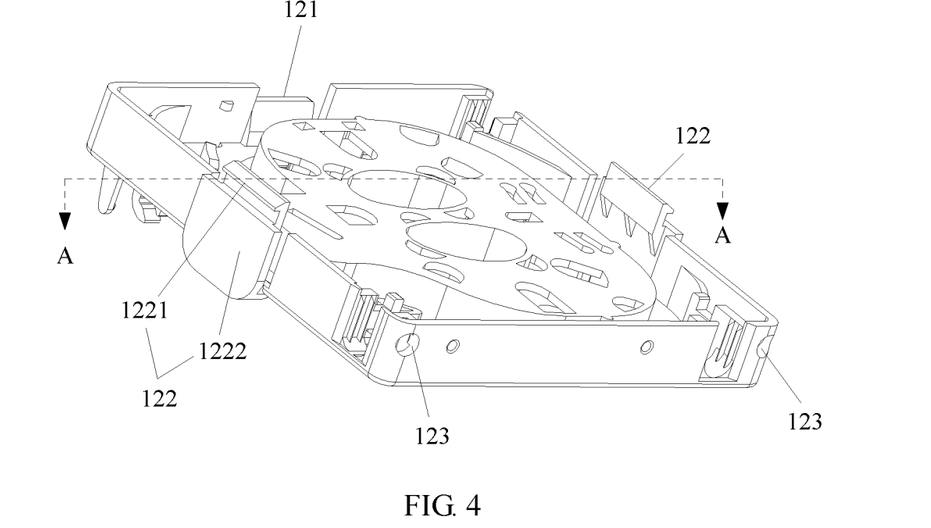
FIG. 4 is a schematic diagram of a three-dimensional structure of a base of an access terminal box according to an embodiment of the present invention.

Referring to FIG. 2, FIG. 3, and FIG. 4 together, an access terminal box provided in an embodiment of the present invention includes a protective cover 11, a base 12, and a base plate 13. A structure of the access terminal box shown in the figures is square-shaped. The protective cover 11 is connected to the base 12 in a fastened manner, and the base 12 is connected to the base plate 13 in a fastened manner. A coiling apparatus configured to coil a fiber is arranged on the base 12.

As shown in FIG. 4, in this embodiment, the protective cover 11 includes a cover plate 110 and side walls 111 that are disposed around the cover plate, the cover plate 110 and the side walls 111 form an open-mouthed box structure, and the base 12 is placed inside the open-mouthed box structure of the protective cover 11. In this embodiment, to facilitate mounting and detachment, the base 12 is fastened inside the open-mouthed box structure of the protective cover 11 by using a first detachable structure, and the base 12 is fastened to the base plate 13 by using a second detachable structure.

Figure 5:
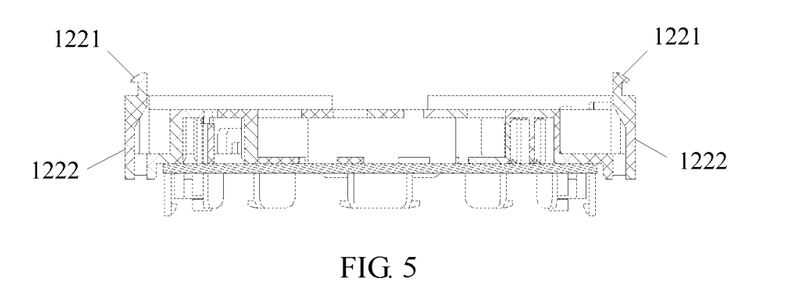
FIG. 5 is a schematic cross-sectional diagram of the access terminal box shown in FIG. 4 along an A-A line.
Figure 6:
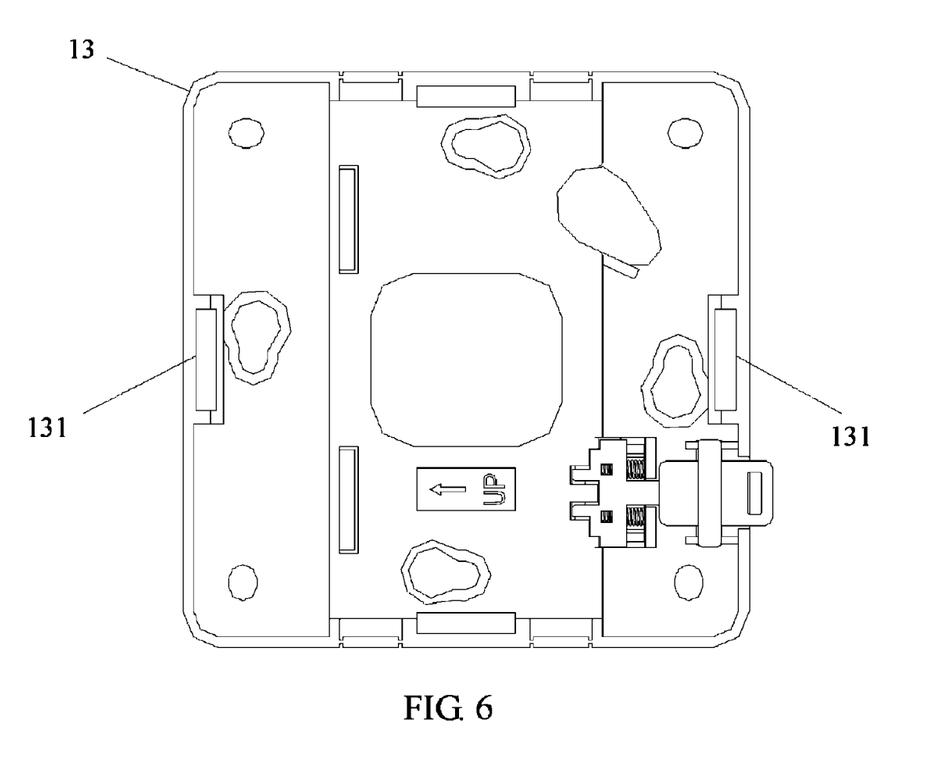
FIG. 6 is a top view of a base plate of an access terminal box according to an embodiment of the present invention.

As shown in FIG. 4, FIG. 5, and FIG. 6, FIG. 4 is an inverse diagram of the base 12 in FIG. 3. FIG. 5 is a cross-sectional view along an A-A line in FIG. 4. In this embodiment, the second detachable structure includes a first locking hook 122 that is arranged to protrude from a bottom plane of the base 12 and a first locking slot 131 that is correspondingly arranged on the base plate 13. The first locking hook 122 and the first locking slot 131 lock to fasten the base 12 to the base plate 13. Preferably, a quantity of first locking hooks 122 is an even number (which is two in the figure), and the first locking hooks 122 are symmetrically arranged on the base 12. It should be noted that, symmetric arrangement includes: one first locking hook 122 is arranged on each of two opposite side walls, or multiple first locking hooks 122 are arranged on each of two opposite side walls, and corresponding first locking slots 131 are accordingly arranged on the base plate 13.

In the present invention, the first locking hook 122 is arranged to protrude from the bottom plane of the base 12, protrusion structure design facilitates mounting and detachment of the base 12 and the base plate 13, and when the protective cover 11 and the base 12 are fastened to each other, mounting and detachment of the base 12 and the base plate 13 are not affected. similarly, when the base 12 and the base plate 13 are fastened to each other, mounting and detachment of the protective cover 11 and the base 12 are not affected either. Compared with an existing practice in which a base can be detached from a base plate only by first detaching a protective cover from the base, the practice in this embodiment is suitable for non-professional personnel to detach the access terminal box, better protects a fiber coiled on the base, and avoids damage to the fiber coiled on the base. Compared with a structure of fastening by using a screw or a bolt, a structure of fastening by using a locking hook and a locking slot in this embodiment is more convenient for mounting and detachment.

Further, as shown in FIG. 4 and FIG. 5, in another embodiment, the first locking hook 122 includes a locking body 1221 and a locking tip 1222, where the locking tip 1221 is arranged to protrude from the bottom plane of the base 12, the locking body 1222 is arranged to protrude from a plane on which a side wall of the base 12 is located, a groove 112 is correspondingly arranged on a side wall of the protective cover 11, and the groove 112 is configured to accommodate the locking body 1221 when the protective cover 11 and the base 12 are fastened to each other. The locking body 1221 is pressed by passing through the groove 112, so that the locking tip 1222 is separated from the first locking slot 131, and the protective cover 11 and the base 12 can be detached as a whole.

Figure 7:
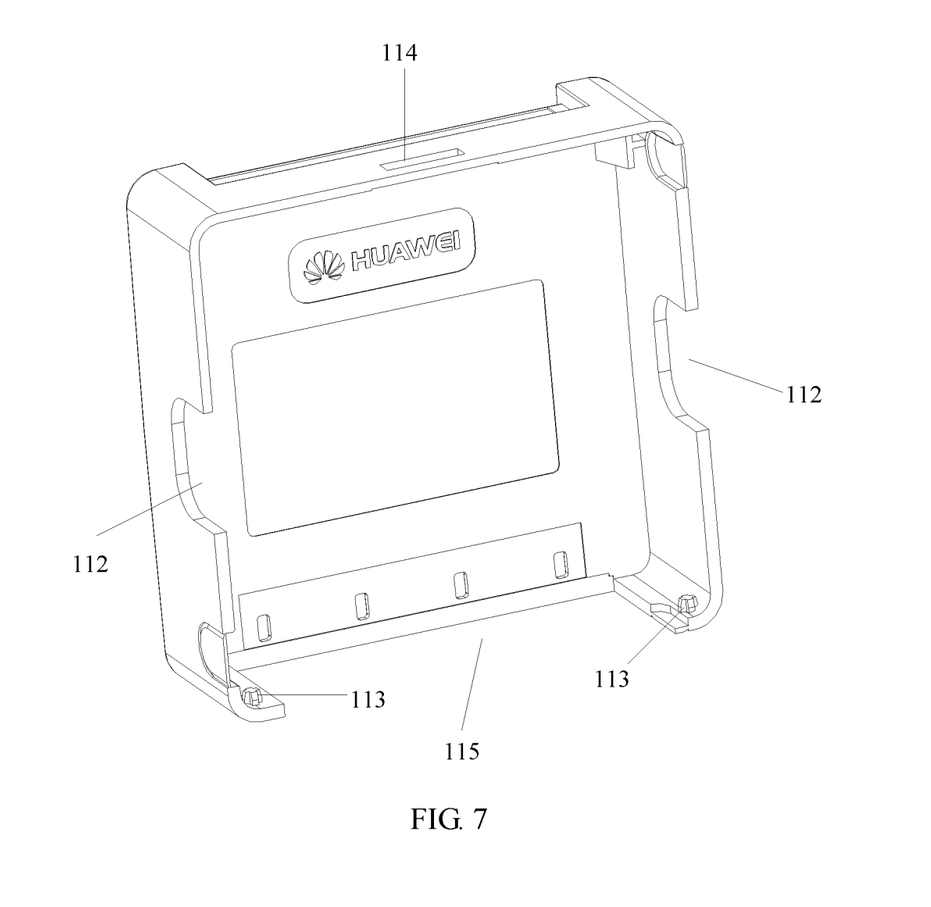
FIG. 7 is a schematic diagram of a three-dimensional structure of a protective cover of an access terminal box according to an embodiment of the present invention.

As shown in FIG. 4 and FIG. 7, in an embodiment, the first detachable structure includes a concave part 123 and a convex part 113, where the concave part 123 is arranged on a side wall of the base 12, the convex part 113 is correspondingly arranged inside a side wall of the protective cover 11, and the convex part 113 and the concave part 123 fit into each other to fasten the base 12 to the protective cover 11. A common design manner is as follows: the concave part 123 is a fastening hole and the convex part 113 is a fastening pillar, as shown in FIG. 7. A shape and a size of the fastening hole and the fastening pillar are determined according to an actual requirement. Certainly, the fastening hole and the fastening pillar may also be designed to be in another form, for example, the concave part 123 may be a concave circular pit, and the convex part 113 may be a convex sphere. To achieve an objective of secure fastening, preferably, two concave parts 123 are symmetrically arranged on side walls of the base 12. Correspondingly, two convex parts 113 are symmetrically arranged inside side walls of the protective cover 11.

Further, as shown in FIG. 4 and FIG. 7, the first detachable structure further includes a second locking hook 121 and a second locking slot 114, where the second locking hook 121 and the second locking slot 114 lock to fasten the base 12 to the protective cover 11. The second locking hook 121 is arranged on a side wall opposite to the side wall, on which the concave part 123 is arranged, of the base 12, that is, the second locking hook 121 and the concave part 123 are located on two opposite side walls. The second locking slot 114 is arranged on a side wall opposite to the side wall, on which the convex part 113 is arranged, of the protective cover 11, that is, the second locking slot 114 and the convex part 113 are located on two opposite side walls. One end is fastened by using the concave part 123 and the convex part 113, and the other end is fastened by using the second locking hook 121 and the second locking slot 114, so that the base 12 is securely fastened to the protective cover 11.

Figure 8:
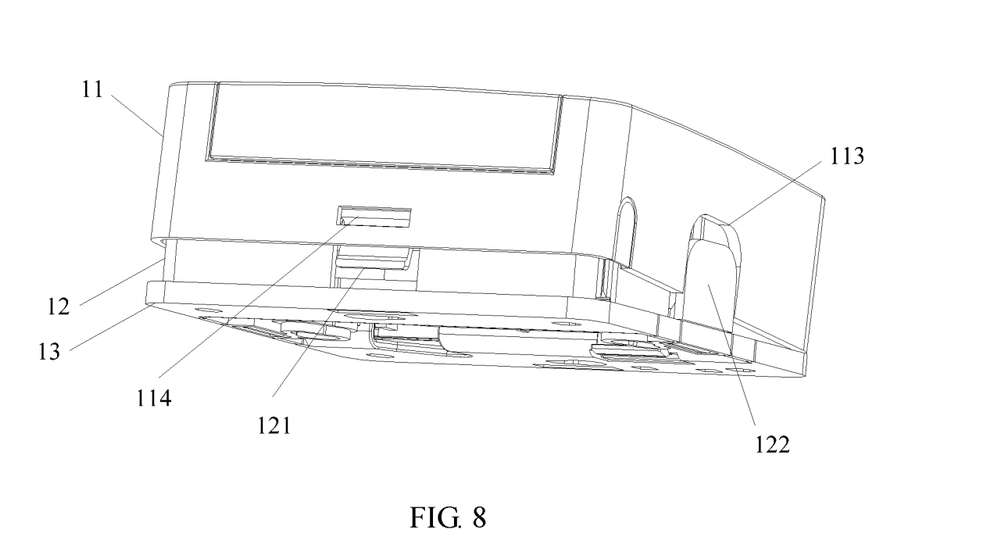
FIG. 8 and FIG. 9 are schematic diagrams of a three-dimensional structure of an access terminal box according to an embodiment of the present invention.
Figure 9:
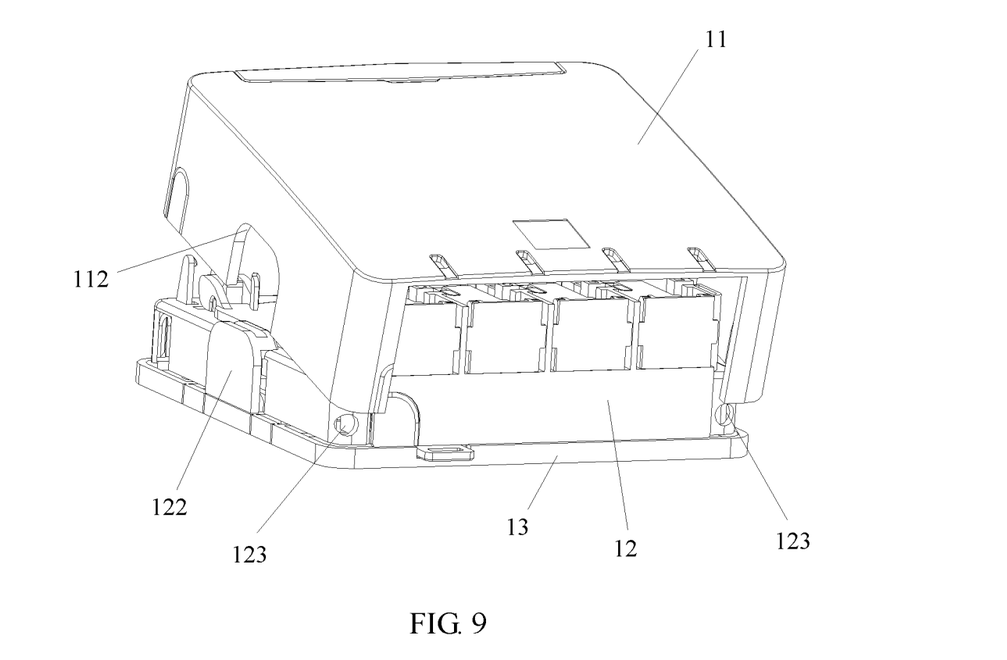

As shown in FIG. 8 and FIG. 9, the second locking hook 121 is pressed, so that the second locking hook 121 is separated from the second locking slot 114 locking, and the protective cover 11 can be separately detached by unscrewing the protective cover 11, which helps professional personnel check, repair, and maintain the access terminal box.

As shown in FIG. 7, an adapter through-hole 115 is further arranged on the side wall, on which the convex part 113 is arranged, of the protective cover 11. As shown in FIG. 3, a movable label plate 116 is further arranged on the side wall, on which the second locking slot 114 is arranged, of the protective cover 11.

In the access terminal box provided in this embodiment of the present invention, by using a first detachable structure and a second detachable structure, when a protective cover 11 and a base 12 are fastened to each other, mounting and detachment of the base 12 and a base plate 13 are not affected. similarly, when the base 12 and the base plate 13 are fastened to each other, mounting and detachment of the protective cover 11 and the base 12 are not affected either. Compared with an existing practice in which a base can be detached from a base plate only by first detaching a protective cover from the base, the practice in this embodiment is suitable for non-professional personnel to detach the access terminal box, better protects a fiber coiled on the base, and avoids damage to the fiber coiled on the base. Compared with a structure of fastening by using a screw or a bolt, a structure of fastening by using a locking hook and a locking slot is more convenient for mounting and detachment.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access terminal box, comprising,
a protective cover;
a base; and
a base plate, wherein
the protective cover comprises:
a cover plate, and
side walls that are disposed around the cover plate, the cover plate and the side walls form an open-mouthed box structure,
the base is fastened inside the open-mouthed box structure of the protective cover by using a first detachable structure,
the base is fastened to the base plate by using a second detachable structure,
the second detachable structure comprises;
a first locking hook that is arranged to protrude from a bottom plane of the base, and
a first locking slot that is correspondingly arranged on the base plate, and the first locking hook and the first locking slot lock to fasten the base to the base plate, wherein the first locking hook comprises a locking body and a locking tip, the locking tip protrudes from the bottom plane of the base, the locking body protrudes from a plane on which a side wall of the base is located, a groove is correspondingly arranged on a side wall of the protective cover, and the groove is configured to accommodate the locking body.

2. The access terminal box according to claim 1, wherein there are two first locking hooks, and there are two first locking slots.

3. The access terminal box according to claim 1, wherein an adapter through-hole is further arranged on a side wall, on which a convex part is arranged, of the protective cover.

4. The access terminal box according to claim 1, wherein a structure is square-shaped.

5. An access terminal box, comprising:
a protective cover;
a base; and
a base plate, wherein
the protective cover comprises:
a cover plate; and
side walls that are disposed around the cover plate, the cover plate and the side walls form an open-mouthed box structure,
the base is fastened inside the open-mouthed box structure of the protective cover by using a first detachable structure,
the base is fastened to the base plate by using a second detachable structure,
the second detachable structure comprises;
a first locking hook that is arranged to protrude from a bottom plane of the base, and
a first locking slot that is correspondingly arranged on the base plate, and the first locking hook and the first locking slot lock to fasten the base to the base plate, wherein the first detachable structure comprises a concave part and a convex part, the concave part is arranged on a side wall of the base, the convex part is correspondingly arranged inside a side wall of the protective cover, and the convex part and the concave part fit into each other to fasten the base to the protective cover.

6. The access terminal box according to claim 5, wherein the first detachable structure further comprises a second locking hook and a second locking slot, the second locking hook is arranged on a side wall opposite to the side wall, on which the concave part is arranged, of the base, the second locking slot is arranged on a side wall opposite to the side wall, on which the convex part is arranged, of the protective cover, and the second locking hook and the second locking slot lock to fasten the base to the protective cover.

7. The access terminal box according to claim 5, wherein the concave part is a fastening hole, and the convex part is a fastening pillar.

8. The access terminal box according to claim 7, wherein there are two fastening pillars, and there are two fastening holes.

9. An access terminal box, comprising:
a protective cover;
a base; and
a base plate, wherein
the protective cover comprises:
   a cover plate; and
   side walls that are disposed around the cover plate, the cover plate and the side walls form an open-mouthed box structure,
the base is fastened inside the open-mouthed box structure of the protective cover by using a first detachable structure.
the base is fastened to the base plate by using a second detachable structure,
   the second detachable structure comprises;
      a first locking hook that is arranged to protrude from a bottom plane of the base, and
      a first locking slot that is correspondingly arranged on the base plate, and the first locking hook and the first locking slot lock to fasten the base to the base plate, wherein a movable label plate is further arranged on a side wall, on which a second locking slot is arranged, of the protective cover.

* * * * *